(12) United States Patent
Gold

(10) Patent No.: US 7,361,616 B2
(45) Date of Patent: *Apr. 22, 2008

(54) INDOOR AND OUTDOOR BAMBOO AREA RUG

(75) Inventor: Darryl S. Gold, Chesterfield, MO (US)

(73) Assignee: Anji Mountain Bamboo Rug Co., St. Louis, MO (US)

( * ) Notice: Subject to any disclaimer, the term of this patent is extended or adjusted under 35 U.S.C. 154(b) by 31 days.

This patent is subject to a terminal disclaimer.

(21) Appl. No.: 11/163,213

(22) Filed: Oct. 10, 2005

(65) Prior Publication Data
US 2006/0165937 A1  Jul. 27, 2006

Related U.S. Application Data

(63) Continuation-in-part of application No. 10/905,826, filed on Jan. 21, 2005.

(51) Int. Cl.
*B32B 5/12* (2006.01)
*B32B 9/02* (2006.01)
*B32B 27/04* (2006.01)
*B32B 27/12* (2006.01)
*D04H 1/08* (2006.01)

(52) U.S. Cl. .............................. 442/45; 442/2; 442/43; 442/321; 442/323; 428/106; 428/107; 428/109; 428/114

(58) Field of Classification Search .................. 442/2, 442/43, 45, 321, 323; 428/105, 107, 109, 428/114
See application file for complete search history.

(56) References Cited

U.S. PATENT DOCUMENTS

| | | | |
|---|---|---|---|
| 250,286 A | 11/1881 | Robbins et al. | |
| 945,575 A | 1/1910 | McPherson | |
| 1,364,376 A | 1/1921 | Isozake | |
| 1,659,141 A | 2/1928 | Grupp | |

(Continued)

FOREIGN PATENT DOCUMENTS

JP  01313012 A  12/1989

(Continued)

OTHER PUBLICATIONS

Natural Area Rugs; "http://www.naturalarearugs.com/bamboo-rug.php"; Internet Website; Dec. 2004; pp. 1 and 2; NaturalAreaRugs.com.

(Continued)

*Primary Examiner*—Jenna-Leigh Johnson
(74) *Attorney, Agent, or Firm*—Paul M. Denk

(57) ABSTRACT

A bamboo Indoor/Outdoor Area Rug that is manufactured from 100% Anji Mountain bamboo from China. The bamboo is all treated with various protective coatings to add resistance to natural factors including water, sun and dirt. All bamboo rugs manufactured for outdoor/indoor use are made from the harder portions of the bamboo trunk. (Some bamboo used for indoor purposes only are manufactured from the softer fibers of the inside of the bamboo trunk). This portion of the bamboo trunk is not utilized for this invention. The bamboo utilized in the present invention is taken from the harder part of the bamboo trunk to assure maximum endurance and longevity. The lower trunk portion of the bamboo plant is harder and less porous.

10 Claims, 2 Drawing Sheets

U.S. PATENT DOCUMENTS

| | | |
|---|---|---|
| 1,984,046 A | 12/1934 | Steiger |
| 2,168,898 A | 8/1939 | Beck |
| 4,301,207 A | 11/1981 | Schomerus |
| 4,608,798 A | 9/1986 | Spiers |
| 5,456,964 A | 10/1995 | Tamura et al. |
| 5,849,645 A | 12/1998 | Lancaster |
| 5,916,105 A | 6/1999 | Gow |
| 5,942,321 A | 8/1999 | Romesberg et al. |
| 6,182,315 B1 | 2/2001 | Lee |

FOREIGN PATENT DOCUMENTS

| | | |
|---|---|---|
| JP | 01320012 A | 12/1989 |
| JP | 02255112 A | 10/1990 |
| JP | 04106265 A | 4/1992 |
| JP | 2002046392 A | 2/2002 |
| JP | 02003024205 A | 1/2003 |

OTHER PUBLICATIONS

RUGSUSA.COM Inc.; "http://rugsusa.com/sisaljute.html"; Internet Website; Dec. 2004; pp. 1 and 2; RugsUSA.com Inc.

RUGSUSA.COM Inc.; "http://rugsusa.com/bamborugs.html"; Internet Website; Dec. 2004; pp. 1 and 2; RugsUSA.com Inc.

Anji Huaxia Bamboo & Wood Products Co., Ltd.; "http://www.hx-aj.com/product.html"; Internet Website; Dec. 2004; p.-6; E-mail: info@hx-aj.com.

INDOOR AND OUTDOOR BAMBOO AREA RUG

CROSS REFERENCE TO RELATED APPLICATION

This application is a continuation-in-part application of U.S. patent application Ser. No. 10/905,826 filed Jan. 21, 2005, currently pending.

BACKGROUND OF INVENTION

1. Field of Invention

This invention relates generally to indoor/outdoor area rugs or mats and, more particularly, to bamboo area rugs.

2. Background Art

Bamboo is a grass, that belongs to the sub-family Bambusoidae of the family Poaceae (Graminae). Bamboo occurs naturally on every industrialized and populated continent with the exception of Europe. There are over 1000 known species of bamboo plants. It is a durable and versatile material, that has been utilized by various cultures and civilizations for various applications. Bamboo has been an integral part of the cultural, social and economic traditions of many societies. There is a vast pool of knowledge and skills related to the processing and usage of bamboo, which has encouraged the use of bamboo for various applications.

Clumping bamboo can be widely grown in tropical climates. The trunk of the plant is called the "culm". The culm is wider at the trunk or bottom and narrows toward the top. In some varieties of bamboo the culm may grow 40 to 60 feet tall. Once established, bamboo plants can replenish themselves in two or three years. Each year a bamboo will put out several full length culms, that are generally hollow, in the form of a tube having "nodes". There are other parts of the bamboo plant that can be utilized other than the culm, including commonly used parts of a bamboo such as branches and leaves, culm sheaths, buds and rhizomes. Some species are very fast growing at the rate of one metre per day, in the growing season.

As mention above, bamboo occurs naturally on most continents, mainly in the tropical areas of a given continent. Its natural habitat ranges in latitude from Korea and Japan to South Argentina. It has been reported that millions tons of bamboo are harvested each year, almost three-fifths of it in India and China. One known source of quality bamboo is found in the Anji Mountains of China.

Bamboo has many uses such as substituting commercially for wood, plastics, and composite materials in structural and product applications. There is a large diversity of species, many of which are available in India, which is the second largest source of bamboo in the world ranking only behind China. These grow naturally at heights ranging from sea level to over 3500. Most Indian bamboo is sympodial (clump forming); the singular exception is Phylostacchus bambuisodes, cultivated by the Apa Tani tribe on the Ziro plateau in Arunachal Pradesh.

A common application for bamboo-based products is to utilize bamboo as a wood substitute. These applications include boards of various size and specifications and uses—laminates, flooring, panels, particleboard, insulation material, chipboard, wafer board, woven mat-board, bamboo ply-substitutes and veneer. Bamboo is in many respects, stronger than many wood products, and is comparable for some critical parameters with even some hardwoods. Bamboo laminates could replace the use of wood in many applications mostly including building and construction. Thin walled bamboo species may not be suitable for boards/laminates, but the thick walled bamboo is suitable. There are various thick walled bamboo species like tulda.

Bamboo has to undergo certain processing stages to convert them into boards/laminates. The green bamboo culms are converted into slivers/slats and then to boards. The boards are finally finished by surface coating. The common primary processing steps for making sliver/slats from green bamboo culms are 1. Cross Cutting; 2. Radial Splitting; 3. Internal Knot Removing & Two-side Planing; 4. Four-side Planing; and 5. forming slivers/slats. The common secondary processing steps for making board/laminate from slivers/slats are 1. Starch Removal & Anti-fungal Treatment; 2. Drying; 3. Resin Application; 4. Laying of Slivers/Slats; 5. Hot Pressing & Curing; and 6. form Laminates/Boards. The common surface coating and finishing stages are 1. Surface Sanding & Finishing; 2. Surface Coating with melamine/polyurethane; 3. Curing of Laminate; 4. Fine Sanding; 5. Evaluation of Surface Properties.

There are various types of bamboo flooring including tongue and groove and the type that needs to be butted together. The lacquered flooring tiles are finished using wear resistant UV lacquer and the unlacquered flooring tiles need to be coated/waxed and polished after installation. The strength of Bamboo Boards can be better than common wood board for its special Hi-steam pressure process. The board has good water resistance for its shrinking and expanding rate. Its water-absorbing rate is better than wood and is further humidity resistant and smooth. It has been reported that the strength of 12 mm bamboo ply-board is equivalent to that of a 25 mm plywood board.

There are also various types of bamboo area rugs made of flat elongated slats or strips arranged side by side length wise and having thread woven around and between the strips binding them together in a side by side arrangement. There is also usually a cloth or felt backing or some other fibrous material bonded to the underside. The bamboo area rugs also usually have a boarder edge binding made of cloth or other durable fibrous material.

The bamboo material is very durable for an area rug application, however, the construction of many bamboo rugs are lacking and the indoor/outdoor capability is limited. A novel bamboo area rug construction is needed.

BRIEF SUMMARY OF INVENTION

The invention is a bamboo Indoor/Outdoor Area Rug that is manufactured from 100% Anji Mountain bamboo from China. The bamboo is all treated with various protective coatings to add resistance to natural factors including water, sun and dirt. All bamboo rugs manufactured for outdoor/indoor use are made from the harder portions of the bamboo trunk. (Some bamboo used for indoor purposes only are manufactured from the softer fibers of the inside of the bamboo trunk). This portion of the bamboo trunk is not utilized for this invention. The bamboo utilized in the present invention is taken from the harder part of the bamboo trunk to assure maximum endurance and longevity. The lower trunk portion of the bamboo plant is harder and less porous. Anji Mountain Bamboo is the only bamboo that is grown in a climate where there is a 'winter freeze' that causes the tree to go dormant with no sap or growth throughout the winter. This causes the tree to become harder than bamboo trees grown in areas that remain warm and moist throughout the year with no chance for the bamboo to go through the seasonal changes that allows for harder and tighter fibers created during the dormant stages our Anji Mountain Bamboo trees experience each winter.

The bamboo for the present invention is kiln dried to prevent warping and remove moisture that can cause future warping. Certain styles of bamboo are oxidized in a boiling vat of liquid to bring out different variations of color vs. the common method of spray staining the bamboo slats to a particular color. The oxidation process also makes the bamboo less porous to moisture. The bamboo is assembled with slats laying next to one another and then assembling in a rug or carpet loom using poly resin fibers, fibrous tape strips, interwoven nylon fibers and/or other fibers, to avoid rot, mold, mildew and decay. During the assembly process in the loom a poly mesh sheet is placed on the bottom side of the rug. A mastic layer is then placed over the poly mesh sheet before a final layer of high density jute or coconut fiber is applied, which is preferably about approximately 2 mm in thickness. Then the rugs are cut to the desired dimensions and a boarder is bonded about the perimeter. The boarder is preferably made of polypropylene or other like material and the boarder is preferably sewn using poly thread or like material. The boarder material is preferred in order to avoid problems with rot, mildew and decay.

The present Outdoor/Indoor Bamboo Area Rug can be manufactured with either a coconut fiber backing or a jute backing. Both of these backings are natural fibers that are resistant to mold, mildew and decay. The coconut fiber and jute fiber backing is processed into a porous matting that allows for natural drainage of water and allows for easy evaporation of moisture that is a primary cause of mold and mildew created in the felt backing or solid resin backing that is most commonly used as a padding surface for bamboo area rugs or most area rugs for that matter. Alternatively, a non-slip backing as described herein can be utilized in lieu of the natural fiber backing or in addition to the natural fiber backing by applying to the underside of the fiber backing. Certain bamboo that is used in the manufacture of the present Outdoor/indoor Bamboo Area Rug is oxidized and gives it an extra step in making the bamboo more impermeable to water, sunlight and dirt. Once the elongated bamboo strips have been processed, they are adjacently aligned lengthwise, and side by side. A fiber mesh sheet is applied and bonded to the underside to hold the strips together. Then the porous mating is bonded to the underside. The present inventions construction provides a product that is resistant to damage from rain, rot, mold, mildew and decay.

These and other advantageous features of the present invention will be in part apparent and in part pointed out herein below.

BRIEF DESCRIPTION OF THE DRAWINGS

For a better understanding of the present invention, reference may be made to the accompanying drawings in which.

DETAILED DESCRIPTION OF INVENTION

Figure 1:
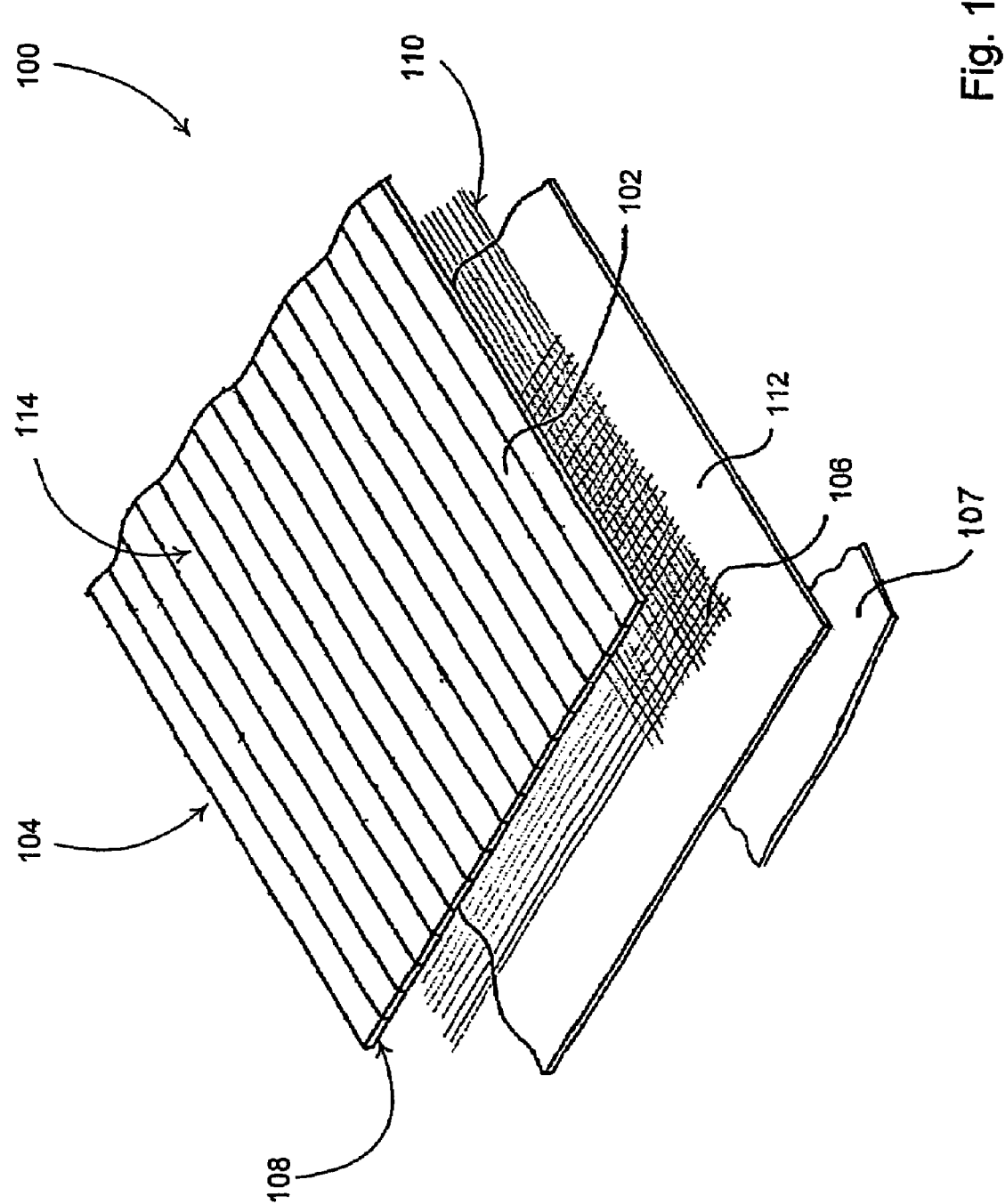
FIG. 1 is a perspective exploded partial cut away view of the bamboo rug layers without the border.
Figure 2:
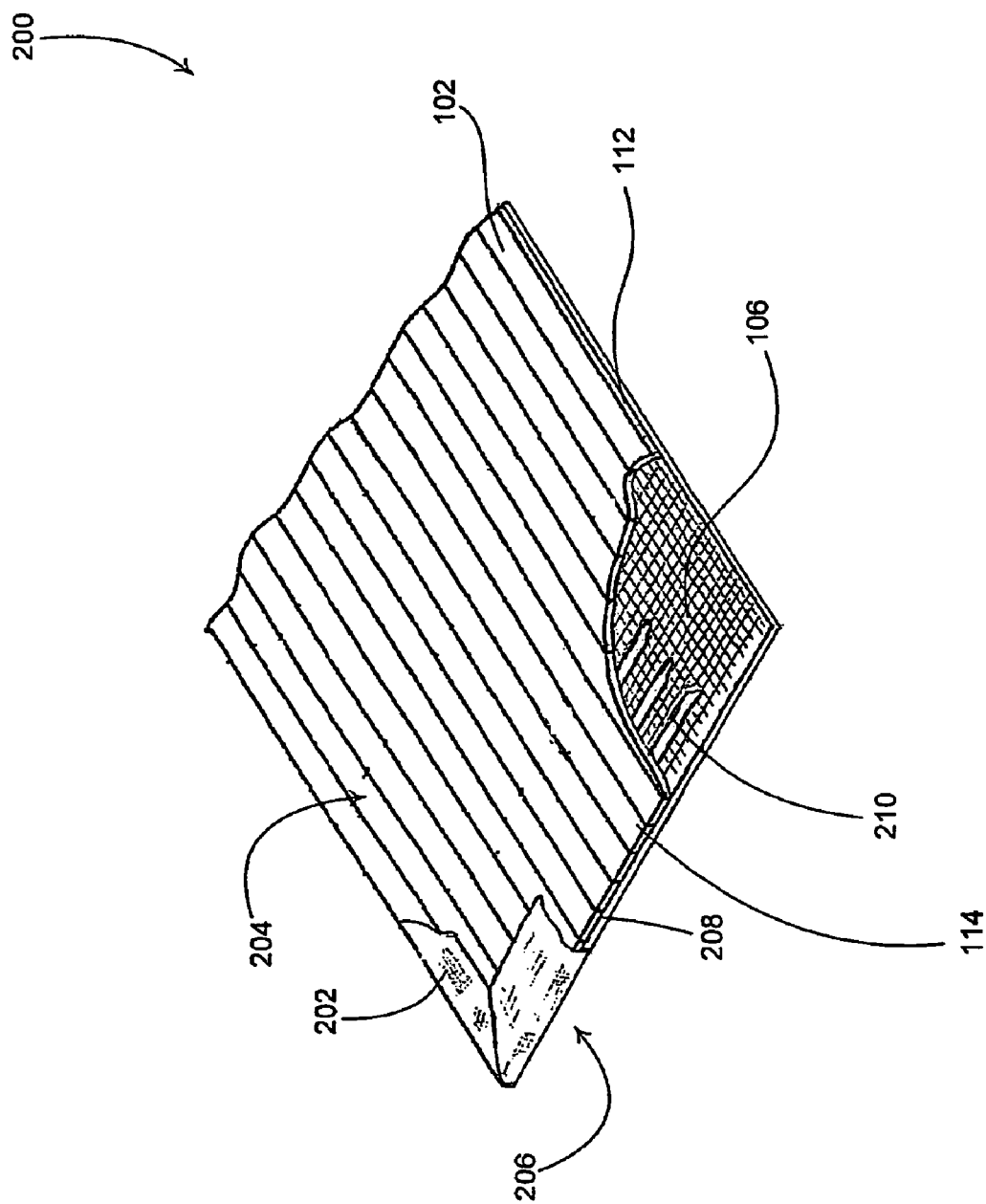
FIG. 2 is a perspective partial cut away view of the bamboo rug assembled with a border.

According to the embodiment(s) of the present invention, various views are illustrated in FIG. 1-2 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising bamboo slats and a jute or coconut fiber backing teaches a novel apparatus and method for an outdoor/indoor bamboo rug that is resistant to moisture.

The details of the invention and various embodiments can be better understood by referring to the figures of the drawing. Referring to FIG. 1, a perspective exploded partial cut away view of the present invention's bamboo rug layers without the border is shown. The outdoor/indoor area rug 100 is shown without a border and with the layers revealed in an exploded view. The rug 100 comprises a plurality of elongated flat bamboo slats 102 arranged lengthwise and side by side and each slat connected in a substantially abutting relationship with respect to an adjacent slat forming a seams 114 between adjacent slats. The connected slats form the bamboo rug portion 104 (bamboo layer). The abutting edges of adjacent slats can be unattached.

The adjacent slats can be connected to each other on the rug's bamboo layer underside 108 (the underside of the slats) by at least one loom fibrous tape strip extending orthogonally with respect to the lengthwise extension of the slats, see item 210 of FIG. 2, using a loom system forming a rug. The loom fibrous tape strip can have some adhesive or adhesion properties on at least one facing surface of the tape strip such that it bonds to the underside of the slats to connect the adjacent slats together from the underside of the slat. The strip can extend orthogonally with respect to the lengthwise extension of the slats and can extend edge to edge of the bamboo layer portion 104.

Alternatively or in addition to continuous fibers can be woven extending orthogonally around and between each of the slats connecting the slats together. Also, the slats can be connected by a series of substantially parallel fibers having adhesive properties extending orthogonally with respect to the lengthwise extension of the slates. The connecting tape strips or fibers 210 can also extend in a crossing angular fashion with respect to the lengthwise extension of the seams 114. A fiber mesh sheet 106 can then be applied on the rug's underside 108. The mesh sheet further bonds the bamboo slats together.

A resin material layer applied to the fiber mesh sheet underside 110 bonding the mesh sheet to the underside of the rug's bamboo layer. The resin material can be for example a mastic resin layer. The mastic resin layer will assist in providing a moisture seal for the underside of the rug for outdoor usage as well as bond the mesh sheet to the bamboo slats' underside 108. Then a high density layer 112 of matted natural fiber is applied to the mesh sheet underside 110. The resin layer assists in bonding the natural fiber layer to the mesh underside. The natural fiber layer can be moisture and mildew resistant for outdoor usage. The natural fiber layer can be made of matted jute bonded under and to the resin material layer or the fiber layer can be matted coconut fiber. Jute and coconut fiber have moisture and mildew resistance characteristics, thus can be for outdoor as well as indoor usage. One embodiment of the natural fiber layer can be about approximately 2 mm in thickness. However, the thickness of the natural fiber layer can vary significantly depending on the application and the environment for which the rug is to be used.

Alternatively, the layer described above as the high density layer 112 of matted natural fiber can alternatively be replaced by a non-slip, indoor-outdoor baking layer that is weather/moisture resistant and made from polypropelene/ PVC formed into a blended rug mat and made with an open weave that allows ventilation for evaporation of moisture. Yet another embodiment could be to apply this polypropylene/pre-layer under the natural fiber layer as described above. See 107 in FIG. 1. This eliminates the need for a user to have a separate non-slip rug pad as a separate under layment and makes the bamboo rug appropriate for indoor and outdoor use. The non-slip backing can be manufactured from a non-skid polypropvlene/PVC or like material blended rug mat with an open weave that allows ventilation for moisture evaporation, perfect for outdoor application. The bamboo rug can be manufactured with an actual non-skid rug pad for indoor use so that a separate non-skid pad does not have to be purchased by the retail consumer. The non-slip mat also takes away the need for the Retail Customer to purchase a non-slip rug pad as a separate purchased item when the rug is purchased for Indoor or Outdoor use.

Referring to FIG. 2, the layers are shown assembled together forming the bamboo rug with a border 200. Once the layers are assembled, a fibrous material border 202 can be folded about and attached around the perimeter of the rug edges 208. The border 202 can be attached on the rug top surface 204 and then wrapped about the rug edges 208 around and attached to the bottom rug surface 206. The border can be attached by stitching completely through the border material and all of the rug layers.

Alternatively, the borders 202 described above as being made of fibrous material can be made of polypropelene, which is resistant to mold, mildew and decay as it is exposed to moisture and the natural elements.

The rug as described herein can be such that the bamboo slats are kiln dried to prevent warping. The rug as described can also be such that the bamboo slats are oxidized in a boiling vat of liquid for coloring the bamboo rather than performing a staining process. The rug as described, can have a resin layer that is a mastic resin layer for sealing and moisture resistance. The rug invention as described herein can be such that the bamboo slats are made of the harder lower trunk portions of the bamboo plant. The loom fiber such as the fibrous tape strip, can be a poly resin fiber.

The fiber mesh sheet can also be a poly fiber mesh sheet, as well as the fibrous material border can be made of polypropylene and attached around the perimeter of the rug with a poly thread sewn stitch. This polypropylene border embodiment provides a significant moisture barrier assisting in preventing moisture penetrating between the layers of the rug.

All of these features provide significant moisture mildew resistance, therefore, providing a bamboo rug with good outdoor characteristics. The construction of the layers bonded under the bamboo slats provide strength and durability as well as characteristics for outdoor usage. The construction and the material contained in the construction described herein also provide substantial flexibility such that he rug can be easily rolled up.

The various bamboo rug examples shown above illustrate a novel outdoor/indoor bamboo rug construction. A user of the present invention may choose any of the above bamboo rug construction embodiments, or an equivalent thereof, depending upon the desired application. In this regard, it is recognized that various forms of the subject outdoor/indoor bamboo rug could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. An outdoor/indoor area rug comprising:
   a plurality of elongated flat bamboo slats arranged lengthwise and side by side and each slat connected in a substantially abutting relationship with respect to an adjacent slat by at least one fibrous tape strip orthogonally applied under the flat bamboo slats for forming a bamboo layer portion of the rug;
   a fiber mesh sheet applied on the underside of the rug;
   a resin material layer applied to the fiber mesh sheet underside bonding the mesh sheet to the underside of the bamboo layer portion of the rug; and
   a high density layer made of matted coconut fiber, and further comprising a polypropylene/PVC layer bonded under the high density matted coconut fiber layer, and
   a fibrous material border folded about and attached around the perimeter edges of the rug.

2. The rug as recited in claim 1, where the bamboo slats are kiln dried to prevent warping.

3. The rug as recited in claim 2, where the bamboo slats are oxidized in a boiling vat of liquid for coloring the bamboo.

4. The rug as recited in claim 3, where the resin layer is a mastic resin layer.

5. The rug as recited in claim 4, where the bamboo slats are made of the harder lower trunk portions of the bamboo.

6. The rug as recited in claim 4, where the high density layer is made of matted coconut fiber, and further comprising a polypropylene/PVC layer bonded under the high density matted coconut fiber layer.

7. The rug as recited in claim 4, where the high density layer is made of matted jute and further comprising a polypropylene/PVC layer bonded under the high density matted jute layer.

8. The rug as recited in claim 4, where the fibrous tape strip is a nylon poly resin sheet.

9. The rug as recited in claim 4, where the fiber mesh sheet is a poly fiber mesh sheet.

10. The rug recited in claim 4, where the fibrous material border is made of polypropylene and attached around the perimeter of the rug with a poly thread sewn stitch.

* * * * *